United States Patent
Zhang et al.

(10) Patent No.: US 10,066,631 B2
(45) Date of Patent: Sep. 4, 2018

(54) DIRECT POWER CONTROL FOR CONSTANT AIRFLOW CONTROL

(71) Applicant: Zhongshan Broad-Ocean Motor Co., Ltd., Zhongshan (CN)

(72) Inventors: Zheng Zhang, Saint Joseph, MI (US); Jizhong Wang, Bolingbrook, IL (US); Yiqiao Zhou, Naperville, IL (US); Yong Zhao, Zhongshan (CN)

(73) Assignee: Zhongshan Broad-Ocean Motor Co., Ltd., Zhongshan (CN)

(*) Notice: Subject to any disclaimer, the term of this patent is extended or adjusted under 35 U.S.C. 154(b) by 875 days.

(21) Appl. No.: 14/375,889

(22) PCT Filed: Jan. 28, 2014

(86) PCT No.: PCT/CN2014/071723
§ 371 (c)(1),
(2) Date: Jul. 31, 2014

(87) PCT Pub. No.: WO2015/113237
PCT Pub. Date: Aug. 6, 2015

(65) Prior Publication Data
US 2016/0281723 A1    Sep. 29, 2016

(51) Int. Cl.
*H02P 6/00* (2016.01)
*F04D 27/00* (2006.01)
(Continued)

(52) U.S. Cl.
CPC ......... *F04D 27/004* (2013.01); *F04D 19/002* (2013.01); *F04D 25/06* (2013.01); *F04D 29/325* (2013.01); *F24F 11/77* (2018.01); *H02P 6/06* (2013.01); *H02P 6/16* (2013.01); *H02P 6/28* (2016.02); *H02P 27/06* (2013.01); *F05D 2270/304* (2013.01); *F05D 2270/335* (2013.01); *H02P 2205/03* (2013.01); *H02P 2207/05* (2013.01); *Y02B 30/746* (2013.01)

(58) Field of Classification Search
CPC .............. F24F 11/0079; F24F 11/0001; F24F 11/0017; F24F 11/0034; Y02B 30/746
See application file for complete search history.

(56) References Cited

U.S. PATENT DOCUMENTS

| | | |
|---|---|---|
| 4,806,833 A | 2/1989 | Young |
| 5,197,667 A | 3/1993 | Bowsky et al. |

(Continued)

FOREIGN PATENT DOCUMENTS

| | | |
|---|---|---|
| CN | 102748843 A | 10/2012 |
| CN | 202550949 U | 11/2012 |

(Continued)

*Primary Examiner* — Shawki S Ismail
*Assistant Examiner* — Zoheb Imtiaz
(74) *Attorney, Agent, or Firm* — Norton Rose Fulbright US LLP

(57) ABSTRACT

A control method for constant airflow controlled by a direct power-controlled PM motor, wherein the PM motor is installed in an HVAC system to drive the rotation of a fan wheel, and wherein the PM motor has a stator component, permanent magnet rotor components, and a motor controller. In some embodiments, the motor controller includes an operation parameters sensing circuit and a microprocessor.

18 Claims, 17 Drawing Sheets

(51) Int. Cl.
*H02P 6/28* (2016.01)
*F04D 19/00* (2006.01)
*F04D 25/06* (2006.01)
*F04D 29/32* (2006.01)
*H02P 6/16* (2016.01)
*H02P 27/06* (2006.01)
*H02P 6/06* (2006.01)
*F24F 11/77* (2018.01)

(56) References Cited

U.S. PATENT DOCUMENTS

| | | |
|---|---|---|
| 5,447,414 A | 9/1995 | Nordby et al. |
| 5,736,823 A | 4/1998 | Nordby et al. |
| 7,216,049 B2 | 5/2007 | Zhang et al. |
| 8,297,068 B2 | 10/2012 | Yokouchi et al. |
| 8,616,202 B2 * | 12/2013 | Tatkov .............. A61M 16/1075 128/203.14 |
| 8,702,482 B2 * | 4/2014 | Helt .................. F24F 11/0001 454/229 |
| 2006/0117769 A1 * | 6/2006 | Helt .................. F24F 11/0001 62/161 |
| 2014/0097775 A1 * | 4/2014 | Chen .................. H02P 6/28 318/400.07 |

FOREIGN PATENT DOCUMENTS

| | | |
|---|---|---|
| JP | H05-180498 A | 7/1993 |
| JP | 2006003015 A | 1/2006 |
| JP | 2009195065 A | 8/2009 |
| JP | 2013-104578 A | 5/2013 |
| JP | 5327045 B2 | 10/2013 |
| JP | 5373863 B2 | 12/2013 |
| WO | 2008/117515 A1 | 10/2008 |

\* cited by examiner

DIRECT POWER CONTROL FOR CONSTANT AIRFLOW CONTROL

CROSS-REFERENCE TO RELATED APPLICATIONS

This application is a national stage filing of PCT/CN2014/071723 filed Jan. 28, 2014, which is hereby incorporated by reference.

TECHNICAL FIELD

The present invention relates to a method for controlling a variable speed motor to provide constant airflow. More specifically, the present invention relates to a control method for providing constant airflow with a direct power-controlled permanent magnet (PM) motor or other variable speed motor in a heating, ventilation, and air conditioning (HVAC) system.

BACKGROUND OF THE INVENTION

A PM motor refers to a direct current (DC) brushless permanent magnet synchronous motor, also known as an electronically commutated motor (ECM). Based on the application in which the motor is used, the control mode for the motor may be different. Common control modes include constant speed control, constant torque control, and constant airflow control. Constant airflow control is a common control mode for motors in HVAC systems.

In an indoor ventilation duct for a household air conditioner, the static pressure often changes with the passage of time, for example, as a result of pipe coating or filter clogging. Static pressure is often higher than the standard static pressure for the nominal system tested in the manufacturer's laboratory because pipe installations are different. Constant airflow control may provide constant airflow to users in these cases to maintain a comfortable ventilation, cooling, or heating effect under a wide range of static pressure conditions, and to make the system achieve high efficiency and energy saving.

A common control method for constant airflow requires a directly-installed air flow meter that not only increases the cost, but also increases the potential for failure because of the failure of the air flow meter. Current air-conditioning manufacturers often use a control method for constant airflow without the air flow meter. Some control methods need to monitor the variation of static pressure to adjust speed, and some calculations involve logarithmic computations or high-order polynomials, which require a microcontroller unit (MCU) of a motor controller to have powerful computational capability, which further increases the cost.

U.S. Pat. No. 4,806,833 discloses a method to change the motor speed based on the torque and the external static pressure to obtain constant air volume. To calculate the external static pressure change based on the variation of rotating speed induced by the motor's own tachometer, an airflow calculation may be obtained as a function torque and rotational speed. U.S. Pat. No. 5,736,823 also discloses a control method for constant air volume that is also a function of the torque and rotational speed.

With respect to the above-described control methods for constant airflow using torque as the key control variable, there are the following technical problems. Torque is a mechanical variable that is difficult to measure and calculate, and that will affect the precision of the control. Torque control is often used in the application of dynamic control, but constant airflow control is typically a steady state control, therefore not suited for torque control. Torque control is more complicated in motor control. Most likely, vector control is required to achieve a good torque control, but the precision of the system torque control is constrained by the cost of the system hardware and software. Torque is not a characteristic parameter by which a consumer can understand the operation of the system or for government regulation. In other words, torque is a mechanical variable that is difficult to directly measure, and using torque as a control variable to realize constant airflow control leads to complex calculations and high cost. In addition, torque is not a good characteristic by which consumers can understand system operation, nor is it a characteristic by which compliance with government regulations can be verified.

BRIEF SUMMARY OF THE INVENTION

The present invention may provide a method for constant airflow control based on direct power control of a PM motor or other variable speed motor in an HVAC system. The control method employs a concise algorithm, is especially suitable for steady-state airflow control, performs a number of central processing unit (CPU) operation requests that is not high, is low cost, has high control accuracy, and is conducive to energy saving and discharge reduction.

According to one embodiment, a method for providing constant airflow with a direct power-controlled PM motor installed in an HVAC system, wherein the motor is configured to drive the rotor rotation and have stator components, PM rotor components, and a motor controller that includes a motor operation parameters detection circuit and microprocessor, includes the following steps:

Step A) starting a motor controller;

Step B) receiving or presetting a target airflow volume value IN-CFM;

Step C) obtaining a function P=f(n) according to the target airflow value IN-CFM, where n is speed and P is the input power of the PM motor;

Step D) entering a direct power control mode for constant airflow control, wherein the motor is controlled so that the motor speed starts at zero and increases along the control path specified by the function P=f(n) to reach a stable working point (pt, nt), wherein Pt, nt are located on the input power and speed pair trajectory specified by the constant airflow control function P=f(n);

Step E) maintaining the direct power control mode for constant airflow control according to the motor operation parameters comprising Pi, wherein Pi is the calculated real-time input power;

Step F) computing a power increment value ΔP, wherein if the power increment value ΔP is less than a set value Pset, then the current working point is maintained;

Step G) if the power increment value ΔP is greater than or equal to the set value Pset, then power and speed control logic is executed to calculate a speed loop operating time to be reached, wherein if the operating time of the speed loop is not reached, then the current working point is maintained; and Step H) if the speed loop operating time is reached, then speed control circuitry is entered according to a regulated speed ni, which is the real-time speed of the motor, to realize a new working point on the input power and speed pair trajectory (Pi, ni), wherein Pt equals Pi, nt equals ni, and operation returns to step D).

According to another embodiment, the above-mentioned motor operation parameter detection circuit includes a bus current detection circuit and a bus voltage detection circuit to detect a real-time bus current $I_{bus}$ and a real-time bus voltage $V_{bus}$, wherein the motor real-time input power is $Pi=I_{bus} \cdot V_{bus}$, and wherein the real-time bus current $I_{bus}$ and a real-time bus voltage $V_{bus}$ are input to a microprocessor.

According to another embodiment, the above-mentioned motor operation parameter detection circuit includes a phase line current detection circuit and a bus voltage detection circuit to detect real-time phase currents, $I_\alpha$ and $I_\beta$, and real-time bus voltages, $V_\alpha$ and $V_\beta$, in an α-β coordinate system, wherein the motor real-time input power is $P_i=3/2 (V_\alpha \cdot I_\alpha + V_\beta \cdot I_\beta)$, and wherein the real-time phase currents, $I_\alpha$ and $I_\beta$, and real-time bus voltages, $V_\alpha$ and $V_\beta$, are input to a microprocessor.

According to another embodiment, the above-described function of P=f(n) is obtained by collecting original data for a plurality of target air volumes by adjusting the static pressure from low static pressure to high static pressure. The range of static pressures may span the actual static pressure range experienced by the motor, and while the static pressure is adjusted the motor speed n and real-time input power Pi may be adjusted to keep airflow at a target air volume. The motor speed n and corresponding real-time input power Pi may be recorded for a plurality of target air volumes to produce a plurality of original data pairs of real-time input power Pi and speed n for the motor. In addition, a function P=f(n) may be determined for a plurality of target airflow values by curve fitting the corresponding recorded original data pairs of real-time input power Pi and speed n of the motor for the target airflow.

According to another embodiment, if the external input target airflow value IN-CFM is not approximately equal to one of the determined target airflow functions P=f(n), then interpolation fitting may be used to calculate a new function P=f(n) corresponding to the external input target airflow value IN-CFM, wherein the new function P=f(n) used to perform the constant airflow control.

According to another embodiment, the above-mentioned motor real-time input power Pi, the real-time bus current $I_{bus}$, and the real-time bus voltage $V_{bus}$ may be low-pass filtered using a digital low-pass filter.

According to another embodiment, the above mentioned function relation formula P=f(n) is a polynomial function: $P=C_m n^{m-1}+ \ldots +C_2 n+C_1$, where $C_1, C_2, \ldots,$ and $C_m$ are the coefficients and n is the motor speed value, and wherein each target airflow corresponding to a set of coefficients $C_1, C_2, \ldots,$ and $C_m$ is stored, and wherein the microprocessor obtains the corresponding set of coefficients $C_1, C_2, \ldots,$ and $C_m$ based on the input target airflow value IN-CFM and one of a look-up table that includes the determined target airflow functions P=f(n) and the new function P=f(n) calculated using the interpolation fitting.

According to another embodiment, the above-mentioned function relation formula P=f(n) is a quadratic function: $P=C_3 n^2+C_2 n+C_1$.

According to another embodiment, an HVAC system configured to perform a method for providing constant airflow includes a PM motor and a fan wheel, wherein the PM motor drives the rotation of the fan wheel, has a stator assembly, PM rotor assembly, and a motor controller, and wherein the PM motor is direct power-controlled and configured to produce constant airflow.

According to another embodiment, an HVAC system configured to perform a method for providing constant airflow includes a variable speed motor and a fan wheel, wherein the variable speed motor drives the rotation of the fan wheel, has a stator assembly, rotor assembly, and a motor controller, and wherein the variable speed motor is direct power-controlled and configured to produce constant airflow.

Compared to existing technology, the present invention has the following effects: 1) experimental methods may be used to obtain the function P=f(n) corresponding to the plurality of input target air flow values $CFM_{set}$; 2) adjusting the motor input power to be equal to a target motor input power value Pt that is calculated based on the motor speed n using a function P=f(n); 3) testing real-time DC bus current $I_{bus}$ or phase current and real-time bus voltage $V_{bus}$, and converting the current to currents $I_\alpha$ and $I_\beta$ on vector α-β coordinates and converting the voltage to the voltages $V_\alpha$ and $V_\beta$ on vector α-β coordinates; 4) calculating the motor real-time input power Pi, and comparing Pi to the calculated target motor input power value Pt to perform closed loop control (as an example, closed loop control may be used to provide high precision and low cost steady state constant airflow control); and 5) processing motor real-time input power Pi with a digital low-pass filter to provide more accurate and low cost calculations.

According to embodiments of the disclosure, the control parameter of the motor by which constant airflow may be provided may be the motor's direct input power. The motor input power is an electrical variable that is easily measured and accurate. In some embodiments, motor input power may be precisely obtained via the DC bus voltage on an inverter coupled to the motor and either the DC bus current on an inverter coupled to the motor or the phase currents of the motor. According to embodiments of the disclosure, direct power control of a motor is well-suited for steady state system control applications, such as constant airflow control. In addition, controlling a motor system with direct power control as disclosed herein allows for more accurate and stable control. In some embodiments, direct power control may be implemented with high precision and low cost via control of the motor's speed.

DETAILED DESCRIPTION OF THE INVENTION

Figure 1:
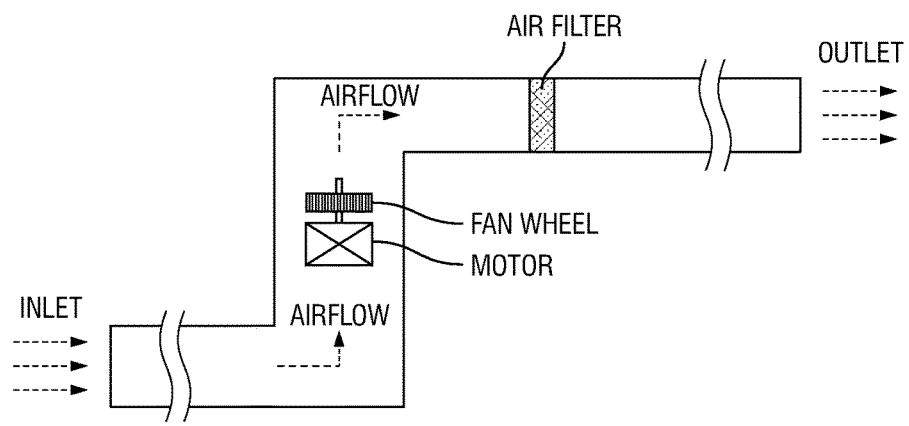
FIG. 1 is a schematic diagram illustrating a traditional air-conditioning fan system structure.

This invention is described for further detail through examples combined with the appended drawings. One embodiment of the present invention is shown in FIG. 1, in which a typical air conditioning ventilating duct installed in a blower system (e.g., gas furnace or air processor) includes a motor, fan wheel, and an air filter within the pipe. When the motor first starts, air begins to flow. However, because the number of outlets and inlet relates to the number of rooms, the design of the pipeline does not have a uniform standard. A filter may also have different pressure drops at the same time. Consequently, a blower system fitted with the traditional single-phase AC motor, such as a PSC motor, has actual airflow that is different than airflow in different pipeline systems.

Figure 2:
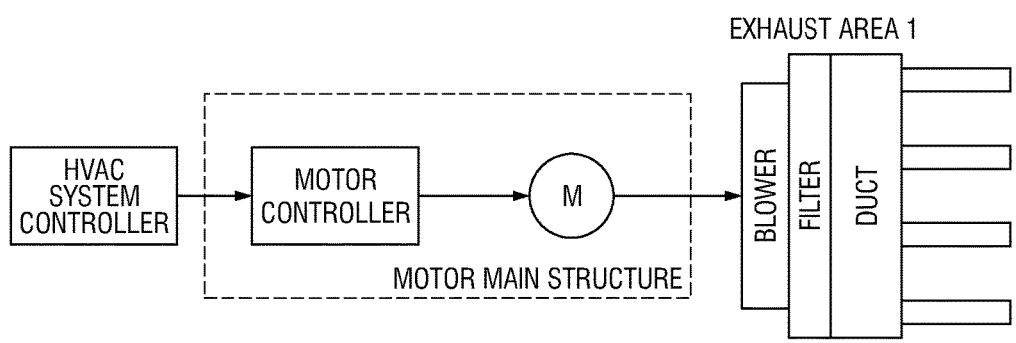
FIG. 2 is a schematic block diagram illustrating a PM motor and installation of the PM motor according to one embodiment of the disclosure.

As shown in FIG. 2, 1) a system includes an HVAC controller that controls operating devices of the system. Information may be sent to the PM motor controller through a peripheral circuit with a custom interface and protocol.

2) The motor controller includes a microprocessor, which may be a single chip or DSP electronic board conducting motor control. Part of the power source provides power to each circuit that is part of the controller, and the power source sets up a DC bus voltage and current. Therefore, the motor control will conduct power transmission. The motor controller that is made with low costs and mass production usually uses a parallel resistance circuit as current and voltage sensing hardware, and a feedback system to control the motor drive carrying out motor control, such as vector control, direct torque control, and other types of sensor based or sensorless controls. As is known to those skilled in the art, the variation of any electronic component's operating parameters impacts testing accuracy and durability.

3) The PM motor rotor includes a magnet body and structure, and multiphase windings at the stator slots. When the temperature changes, the resistance of the windings will change, which may lead to a variation in motor control. Motor manufacturing processes often also create some variation to a certain degree. The aging of the motor and whether the motor is a new motor or an old motor are also contributing factors that affect accuracy and durability, such as the lifespan of the motor. Moreover, the magnet or the magnetic flux of the motor may be affected by temperature changes, demagnetization, etc. In addition, the motor shaft failure, the security of the system, and the detection or real-time monitoring of parameters is also impacted by temperature changes and variation.

4) The blower is installed on the motor shaft, and causes air to flow at a certain speed. Installation position may affect the operation, may increase the friction, cause low flow, or even cause rotation in a wrong direction.

5) The filter should be replaced and receive maintenance service periodically. But this can be forgotten over a long period of time tracking, which can increase the friction and impact the air pressure.

6) Pipeline control: pipeline system may change due to dust, a broken duct, regional control, and on/off wind port system pressure changes. A system performing constant airflow control may have a lot of unstable factors as a result of the foregoing pipeline system changes.

Figure 3:
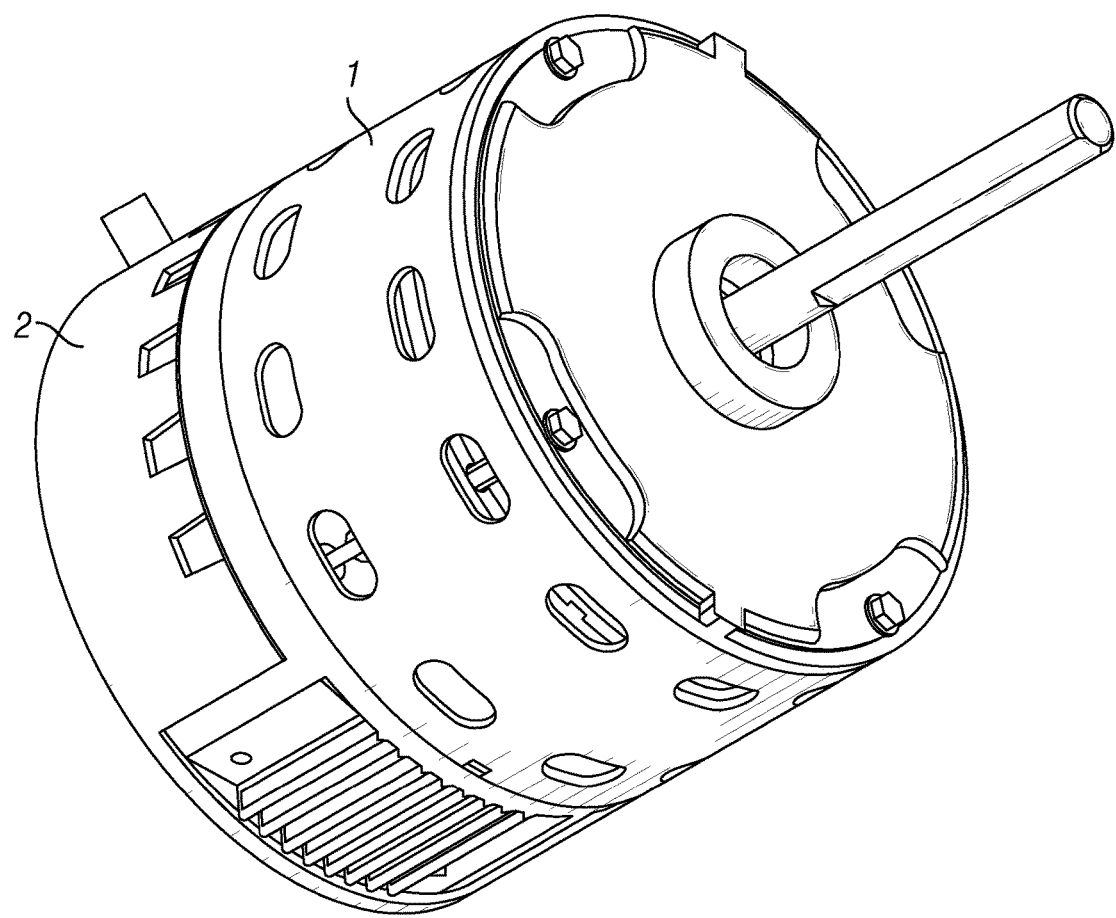
FIG. 3 is an illustration showing a stereogram of the PM motor according to one embodiment of the disclosure.
Figure 4:
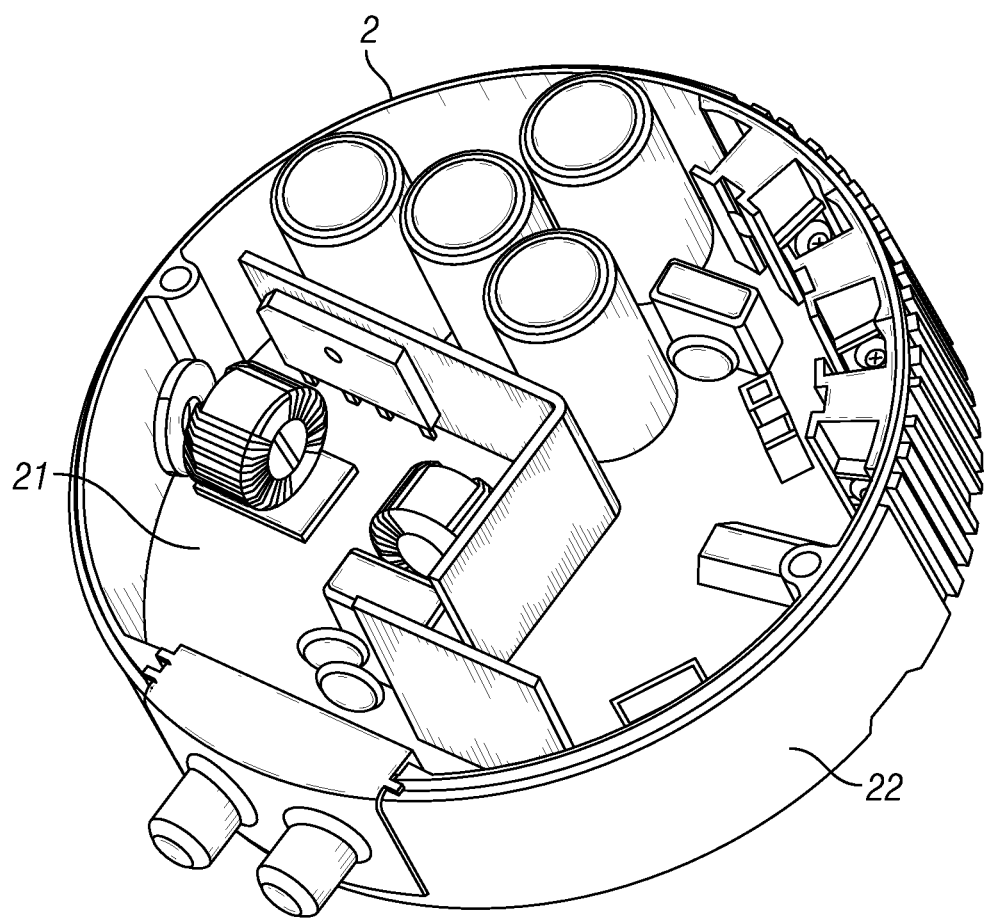
FIG. 4 is an illustration showing the motor controller stereogram of the PM motor according to one embodiment of the disclosure.
Figure 5:
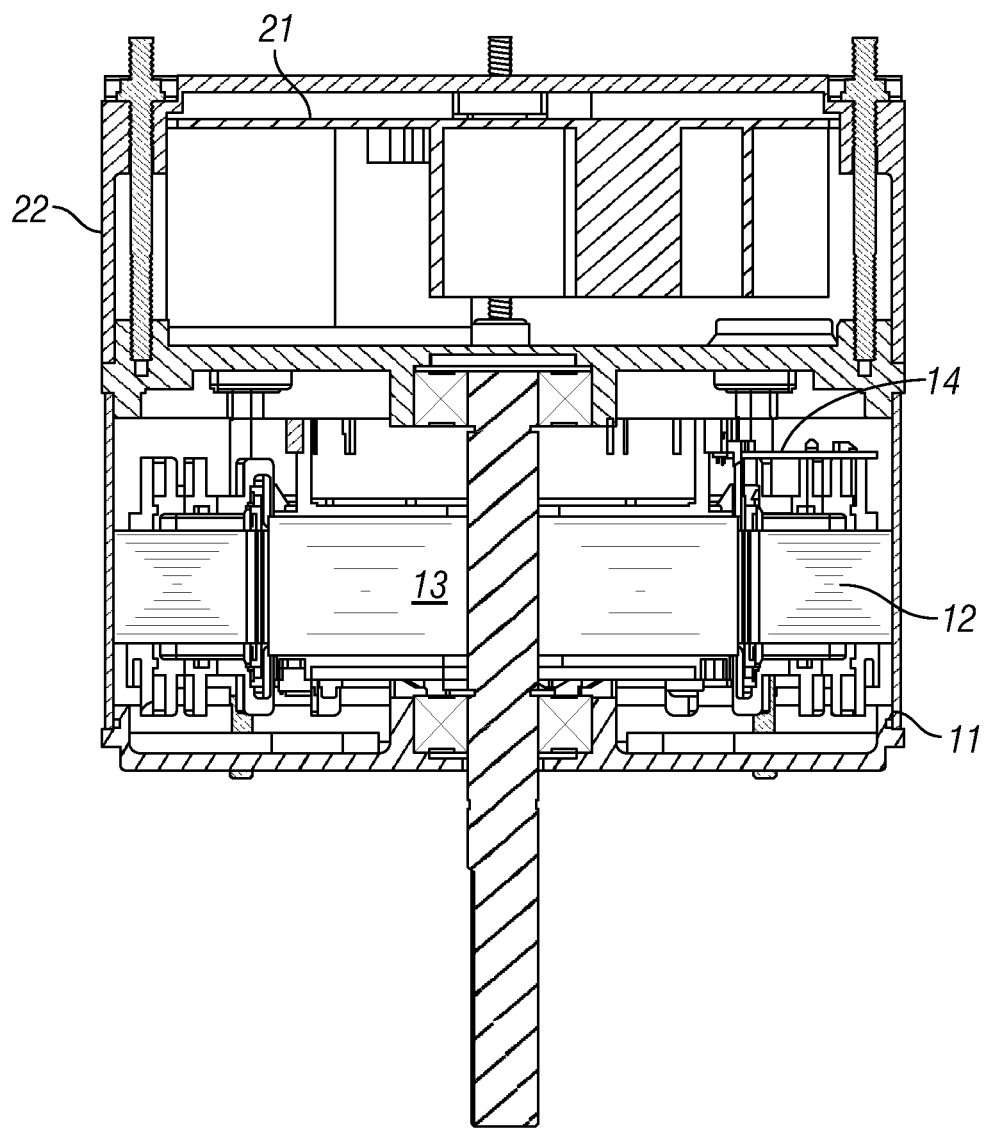
FIG. 5 is an illustration showing the sectional view of the PM motor according to one embodiment of the disclosure.

As shown in FIG. 3, FIG. 4, and FIG. 5, a PM motor usually includes a motor controller 2 and a motor main structure, wherein the motor main structure 1 includes stator components 12, rotor components 13, and housing components 11. The stator components 12 may be installed on the housing components 11. The motor main structure 1 also includes a hall sensor 14 for detecting rotor position. The rotor components 13 may be located on the inside or outside of stator 12. In some embodiments, motor controller 2 may include the control box 22 and control PCB 21, which may be installed inside the control box 22. The control circuit board may generally include a power circuit, microprocessor, DC bus current sensing circuit, inverter circuit, and a rotor position sensing circuit (14) (i.e., the hall sensors). The power circuit may supply power to each part of the circuit, and the rotor position sensing circuit may test a rotor position signal and input the result to a microprocessor. In some embodiments, the inverter DC bus current sensing circuit may input DC bus current to the microprocessor, and the DC bus voltage sensing circuit may input a DC bus voltage to the microprocessor, wherein the microprocessor controls the inverter circuit, inverter circuit control power on/off, and each winding of the stator component 12.

Example 1

Figure 6:
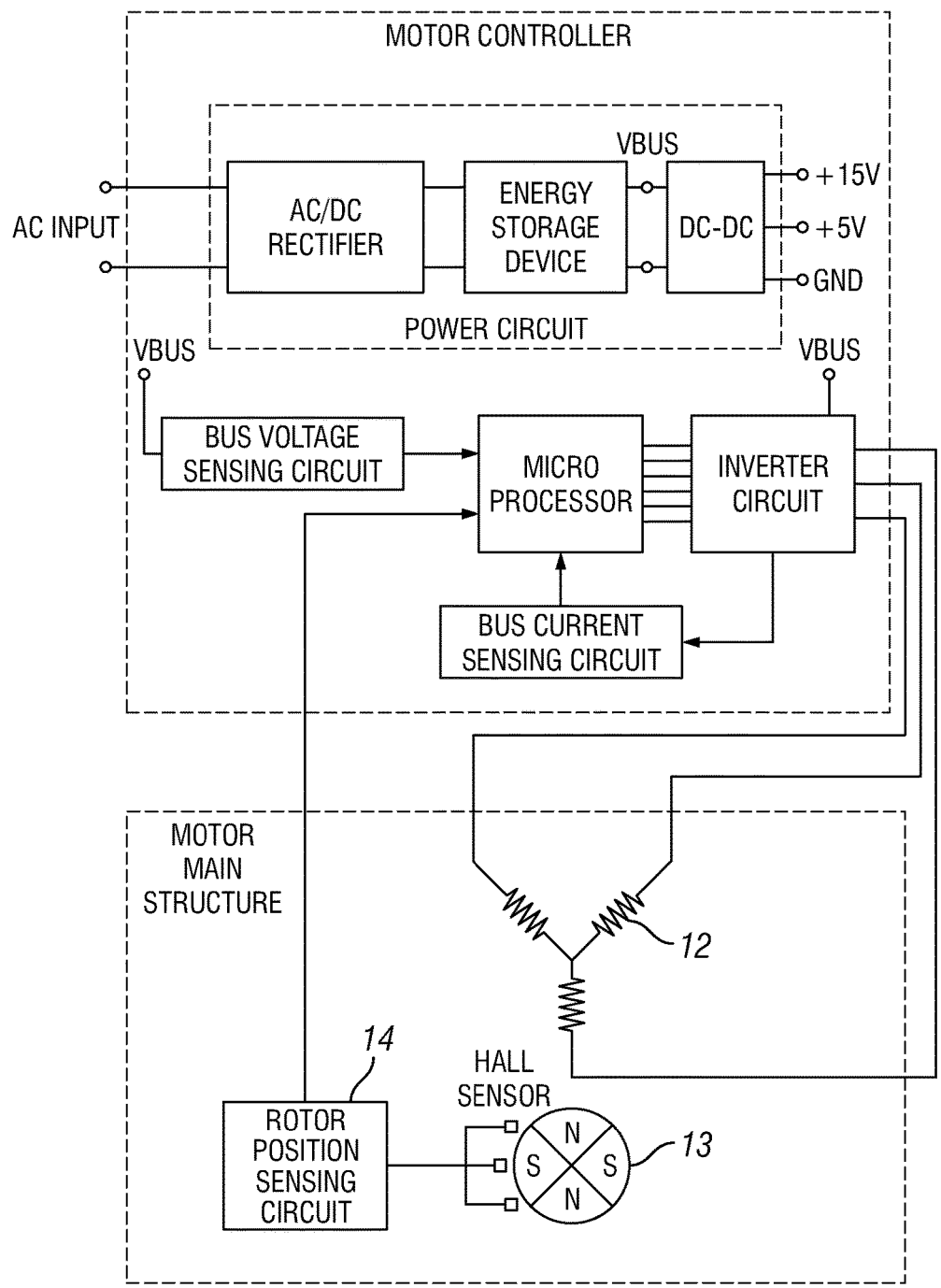
FIG. 6 is a circuit block diagram of the motor controller of a PM motor according to one embodiment of the disclosure.
Figure 7:
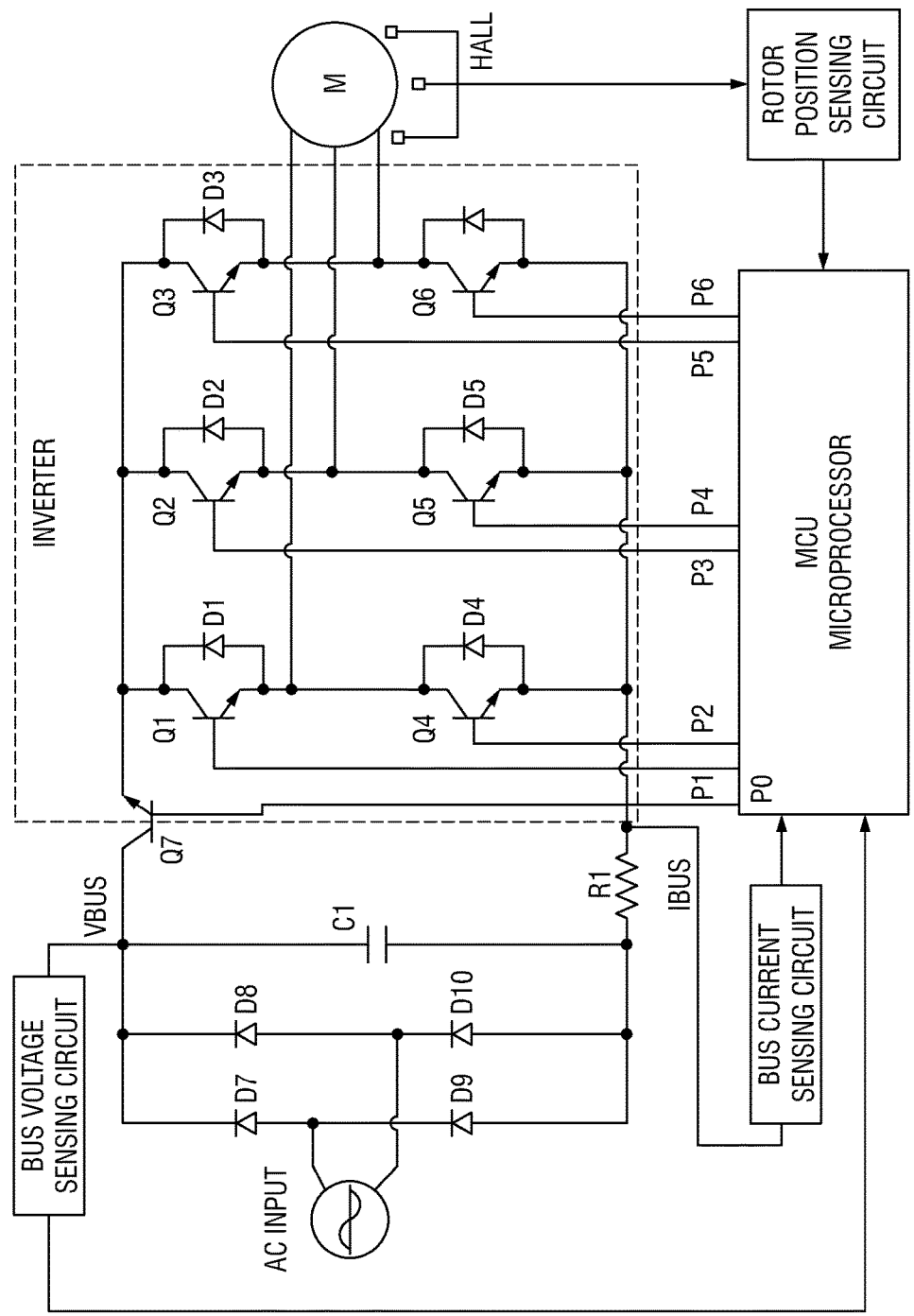
FIG. 7 is another circuit block diagram of the motor controller of a PM motor according to one embodiment of the disclosure.

As shown in FIGS. 6-7, assuming that the PM brushless DC motor is a three-phase PM synchronous motor, rotor position sensing circuit 14 may use three hall sensors to detect a rotor position of a 360° electrical cycle. AC INPUT passes through a full-wave rectifier circuit consisting of the diodes D7, D8, D9, and D10, and the DC bus voltage $V_{bus}$ is output at one end of capacitor C1, wherein the DC bus voltage $V_{bus}$ is associated with the input AC voltage, AC INPUT. The line voltage UP of a three-phase winding may be the PWM chopper output voltage, UP=$V_{bus}$*w, where w is the duty ratio of the PWM signal that the microprocessor inputs to the inverter circuit. Note that changing the line voltage UP can change the DC bus current $I_{bus}$. An inverter circuit may consist of electronic switches Q1, Q2, Q3, Q4, Q5, and Q6, wherein the control ends of electronic switches Q1, Q2, Q3, Q4, Q5, and Q6 are controlled by 6-channel PWM signals P1, P2, P3, P4, P5, and P6 output by a microprocessor. The inverter circuit may also use resistor R1 to sense the DC bus current $I_{bus}$, wherein the DC bus current sensing circuit converts the sensed bus current $I_{bus}$ through resistor R1, and sends the result to the microprocessor. Motor input power may be controlled by the electronic switch Q7, wherein the microprocessor outputs a PWM signal to control switch Q7. That is, microprocessor output P0 may be used to control the electronic switch tube Q7, which in turn controls the motor input power.

Figure 8:
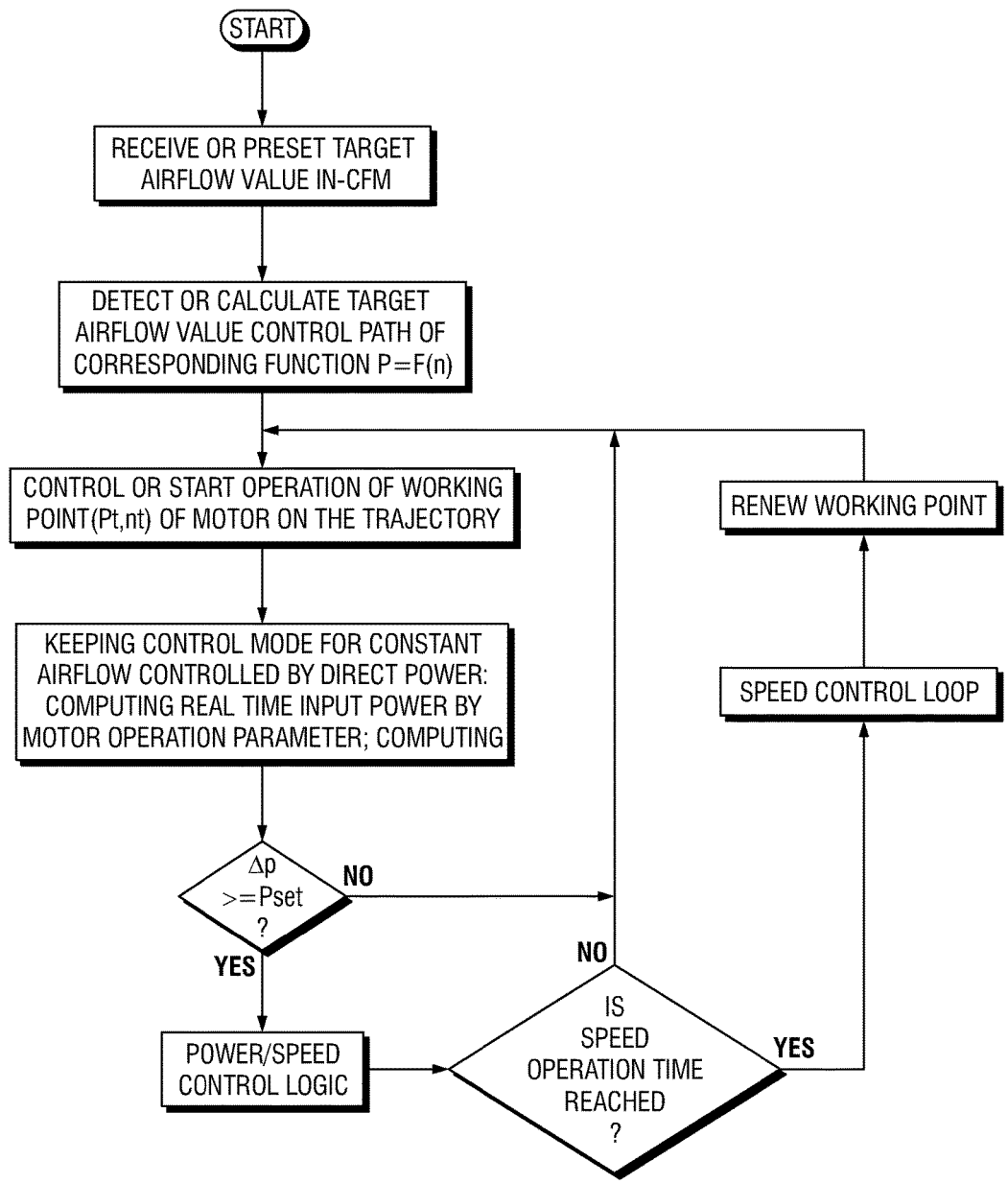
FIG. 8 is a flow chart diagram of a control method for constant airflow according to one embodiment of the disclosure.

In FIG. 8, a control method for providing constant airflow with a direct power-controlled PM motor of an HVAC system is provided. The PM motor may drive a fan wheel and may include stator components, PM rotor components, and a motor controller. The motor controller may include a micro processing unit, inverter circuit, rotor position sensing circuit, DC bus current sensing circuit, DC bus voltage sensing circuit, and motor input power control circuit (not shown). The rotor position sensing circuit may sense the rotor position signal and input the result to the microprocessor. The microprocessor may calculate the real-time speed n of a motor according to the rotor position signal. The DC bus current sensing circuit may input a DC bus current to the microprocessor, and the DC bus voltage sensing circuit may input a DC bus voltage to the microprocessor. The microprocessor may control the inverter circuit to control the power on/off signals for each coil winding of the stator component. The microprocessor may have circuitry to control motor input power. According to one embodiment, a control method for providing constant airflow with a direct power-controlled PM motor of an HVAC system includes the following steps:

Step A) starting a motor controller;

Step B) receiving or presetting a target airflow volume value IN-CFM;

Step C) obtaining a function $P=f(n)$ according to the target airflow value IN-CFM, where n is speed and P is the input power of the PM motor;

Step D) entering a direct power control mode for constant airflow control, wherein the motor is controlled so that the motor speed starts at zero and increases along the control path specified by the function $P=f(n)$ to reach a stable working point (pt, nt), wherein Pt, nt are located on the input power and speed pair trajectory specified by the constant airflow control function $P=f(n)$;

Step E) maintaining the direct power control mode for constant airflow control according to the motor operation parameters comprising $P_i$, wherein $P_i$ is the calculated real-time input power;

Step F) computing a power increment value $\Delta P$, wherein if the power increment value $\Delta P$ is less than a set value Pset, then the current working point is maintained;

Step G) if the power increment value $\Delta P$ is greater than or equal to the set value Pset, then power and speed control logic is executed to calculate a speed loop operating time to be reached, wherein if the operating time of the speed loop is not reached, then the current working point is maintained; and Step H) if the speed loop operating time is reached, then speed control circuitry is entered according to a regulated speed ni, which is the real-time speed of the motor, to realize a new working point on the input power and speed pair trajectory (Pi, ni), wherein Pt equals Pi, nt equals ni, and operation returns to step D).

According to an embodiment, the above-described function of $P=f(n)$ is obtained by collecting original data for a plurality of target air volumes by adjusting the static pressure from low static pressure to high static pressure. The range of static pressures may span the actual static pressure range experienced by the motor, and while the static pressure is adjusted the motor speed n and real-time input power Pi may be adjusted to keep airflow at a target air volume. The motor speed n and corresponding real-time input power Pi may be recorded for a plurality of target air volumes to produce a plurality of original data pairs of real-time input power Pi and speed n for the motor, wherein a function $P=f(n)$ is determined for a plurality of target airflow values by curve fitting the corresponding recorded original data pairs of real-time input power Pi and speed ni of the motor for the target airflow.

According to another embodiment, if the external input target airflow value IN-CFM is not approximately equal to one of the determined target airflow functions $P=f(n)$, then interpolation fitting may be used to calculate a new function $P=f(n)$ corresponding to the external input target airflow value IN-CFM, wherein the new function $P=f(n)$ may be used to perform the constant airflow control.

According to another embodiment, the above mentioned function relation formula $P=f(n)$ is a polynomial function: $P=C_m n^{m-1} + \ldots + C_2 n + C_1$, where $C_1, C_2, \ldots,$ and $C_m$ are the coefficients and n is the motor speed value, and wherein each target airflow corresponding to a set of coefficients $C_1, C_2, \ldots,$ and $C_m$ is stored, and wherein the microprocessor obtains the corresponding set of $C_1, C_2, \ldots,$ and $C_m$ coefficients based on the input target airflow value IN-CFM and one of a look-up table that includes the determined target airflow functions $P=f(n)$ and the new function $P=f(n)$ calculated using the interpolation fitting.

According to another embodiment, the above-mentioned function relation formula $P=f(n)$ is a quadratic function: $P=C_3 n^2 + C_2 n + C_1$.

Figure 9:
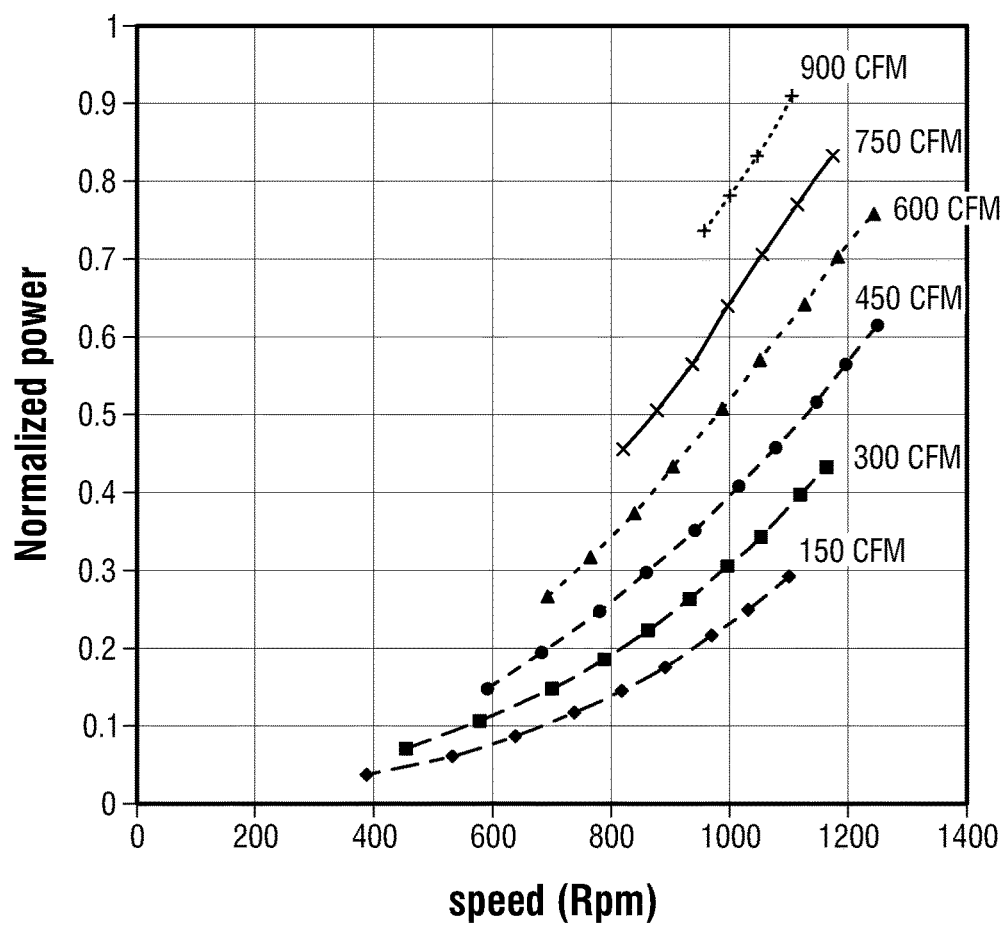
FIG. 9 is an illustration showing a set of fitted curves of constant airflow obtained by experimental measurement according to one embodiment of the disclosure.

The development of the control method of the present invention for constant airflow controlled by a direct-power controlled PM motor and the establishment of a mathematical model for the control method may be described as follows: generally, in a ventilation system, a fan driven by a PM motor produces airflow under a steady state. A constant airflow control may be realized through control of the speed and power of the motor at a static pressure, as shown in the following formula: CFM=F (P, speed, pressure), wherein CFM is airflow in Cubic Feet per Minute (CFM), P is the power, speed is rotation speed, pressure is static pressure. When the static pressure changes, the constant CFM is maintained, for example, within about plus or minus 5 percent, by the control of power and speed. When the static pressure is increased, the power and speed are varied. A cluster of constant airflow CFM curves can be tested, as shown in FIG. 9. A control model can be developed based on the CFM curves of constant airflow. When a system control determines a required airflow, a constant airflow CFM may be provided under specific static pressure through the control of power and speed.

In FIG. 9, characteristic curves represent physical properties of the power and speed to maintain constant air volume, for example, within about plus or minus 5 percent, within the entire power rating range of the motor and any type of airflow system designed by air-conditioning manufacturers. Based on the test results of the power and velocity curves, it can be concluded that a typical quadratic function, such as $P=C_3 n^2 + C_2 n + C_1$, can be used to develop modeling curves through appropriate selection of three points ($C_1, C_2,$ and $C_3$). In some embodiments, the coefficients $C_1$, $C_2$, and $C_3$ may be obtained using a least-squares method with given experimental data sets $\{(x_1, y_1), \ldots, (x_n, y_n)\}$, where n=3. As an example, see the following formula:

$$F(A,B,C)=\Sigma_i^m(Y_i-(C_3n_i^2+C_2n_i+C_1))^2,$$

where $F(A,B,C)$ is minimized by solving the equations $\partial F/\partial A=0$, $\partial F/\partial B=0$, and $\partial F/\partial C=0$.

The process of curve fitting includes the selection of curves of polynomials based on the least-squares method. In general, the function $P=C_m n^{m-1}+ \ldots +C_3n^2+C_2n+C_1$ can be used to model the pairs of power and speed data as a curve. In one embodiment, the functional relationship between P and n may be a quadratic function: $P=C_3n^2+C_2n+C_1$, wherein $C_1$, $C_2$, and $C_3$ are the coefficients, n is the motor speed value, and any a target airflow corresponds to a set of coefficients $C_1$, $C_2$, and $C_3$ stored among a plurality of target airflows. In some embodiments, the microprocessor may obtain a set of corresponding coefficients $C_1$, $C_2$, and $C_3$ based on the input target airflow value IN-CFM through the use of a look-up table method. Thus, the functional relationship formula $P=f(n)$ may be obtained, wherein every target airflow corresponds to a set of coefficients $C_1$, $C_2$, and $C_3$ among any load, and they are shown in Table 1 below.

TABLE 1

| CFM | $C_1$ | $C_2$ | $C_3$ |
|---|---|---|---|
| 150 | 0.338 | −0.151 | 0.0458 |
| 300 | 0.4423 | −0.2113 | 0.0765 |
| 450 | ∘ ∘ ∘ | ∘ ∘ ∘ | ∘ ∘ ∘ |
| 600 | ∘ ∘ ∘ | ∘ ∘ ∘ | ∘ ∘ ∘ |
| 750 | ∘ ∘ ∘ | ∘ ∘ ∘ | ∘ ∘ ∘ |
| 900 | ∘ ∘ ∘ | ∘ ∘ ∘ | ∘ ∘ ∘ |

Figure 10:
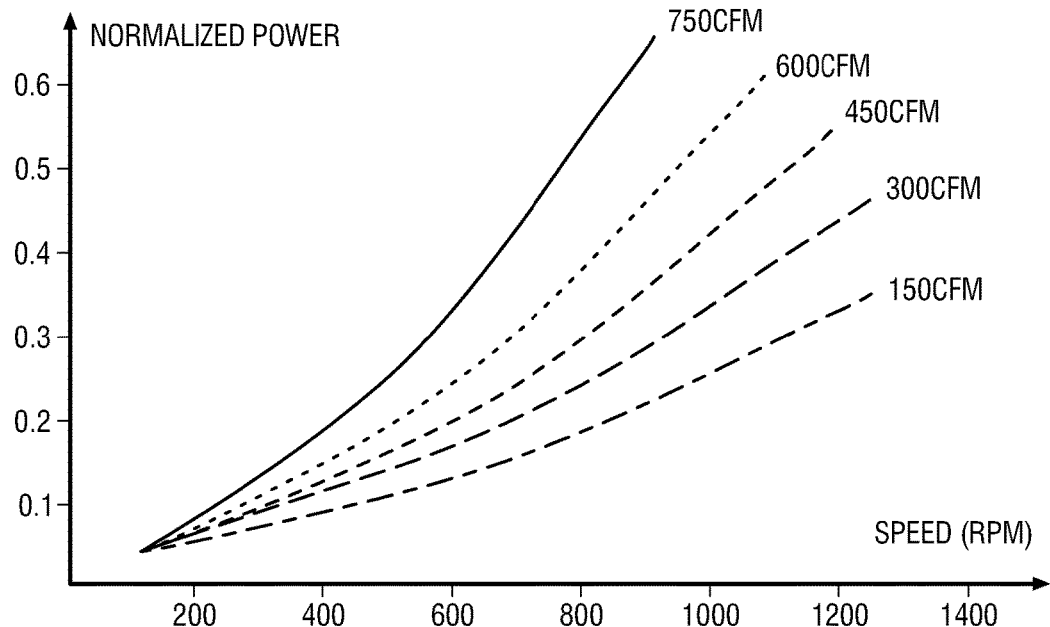
FIG. 10 is an illustration showing the fitting curves of experimental data of constant airflow that is controlled by a direct power-controlled ⅓ HP PM motor according to one embodiment of the disclosure.

FIG. 10 is an illustration showing the fitting curves of experimental data of constant airflow that is controlled by a direct power-controlled ⅓ HP PM motor in an HVAC system. For a given target airflow, a system may choose some typical airflow CFM volumes as test points to create a database in order to establish mathematical model. These typical points may include the minimum and maximum airflow CFM values, adding some intermediate points based on product specifications. In some embodiments, five typical airflow CFM test points include 150/300/450/600 and 750 CFM, respectively.

Table 2 shows an example of the test data results. The motor speed in table 2 ranges from 200 to 1400 RPM, and the static pressure of the system ranges from 0.1 to 1 in $HO_2$. Maintaining the preset constant airflow CFM output constant, for example, within about plus or minus 5 percent, a series of motor input power values are obtained, and a database is formed based on the obtained power values as shown in FIG. 10.

TABLE 2

| 150 CFM airflow | | 300 CFM airflow | | 450 CFM airflow | | 600 CFM airflow | | 750 CFM airflow | |
|---|---|---|---|---|---|---|---|---|---|
| Speed | Power | Speed | Power | Speed | Power | Speed | Power | Speed | Power |
| 385.3 | 3.6% | 452.2 | 6.9% | 590.1 | 14.8% | 693.6 | 26.6% | 822.9 | 45.6% |
| 385.9 | 3.6% | 577.7 | 10.6% | 680.6 | 19.6% | 763.9 | 31.6% | 878.1 | 50.4% |
| 531 | 6.0% | 700.3 | 14.6% | 778.5 | 24.7% | 839.3 | 37.2% | 936 | 56.4% |
| 637.3 | 8.6% | 787.5 | 18.4% | 858.4 | 29.8% | 905 | 43.2% | 997.9 | 63.9% |
| 737.4 | 11.6% | 861.2 | 22.2% | 940.5 | 35.2% | 987.8 | 50.6% | 1056 | 70.5% |
| 818.4 | 14.4% | 932.6 | 26.2% | 1015 | 41.0% | 1051 | 57.0% | 1115 | 77.1% |
| 891 | 17.4% | 997.9 | 30.5% | 1078 | 45.6% | 1127 | 64.1% | 1176 | 83.3% |
| 970.3 | 21.5% | 1053 | 34.2% | 1146 | 51.6% | 1184 | 70.2% | 1173 | 83.2% |
| 1029 | 24.8% | 1119 | 39.7% | 1197 | 56.6% | 1245 | 75.0% | | |
| 1100 | 28.3% | 1165 | 43.1% | 1252 | 61.6% | | | | |
| 1163 | 32.4% | | | | | | | | |

Each preset CFM airflow may correspond to a quadratic function of power and speed that is obtained using a standard calculation process that applies the least-squares method. Equations (3) through (7) define a pair of power and speed working points for any system working point at a specific static pressure.

$$\text{Power}(150) = 0.3388\left(\frac{\text{Speed}}{1000}\right)^2 - 0.1551\left(\frac{\text{Speed}}{1000}\right) + 0.0458 \quad (3)$$

$$\text{Power}(300) = 0.4423\left(\frac{\text{Speed}}{1000}\right)^2 - 0.2113\left(\frac{\text{Speed}}{1000}\right) + 0.0765 \quad (4)$$

$$\text{Power}(450) = 0.3987\left(\frac{\text{Speed}}{1000}\right)^2 - 0.0308\left(\frac{\text{Speed}}{1000}\right) + 0.0294 \quad (5)$$

$$\text{Power}(600) = 0.2580\left(\frac{\text{Speed}}{1000}\right)^2 + 0.3983\left(\frac{\text{Speed}}{1000}\right) - 0.1379 \quad (6)$$

$$\text{Power}(750) = 0.1385\left(\frac{\text{Speed}}{1000}\right)^2 + 0.8150\left(\frac{\text{Speed}}{1000}\right) - 0.3139 \quad (7)$$

According to an embodiment, when an airflow input IN-CFM is input, the motor system may use a corresponding power and speed pair quadratic function to define a working point trajectory to follow during motor operation to maintain constant the preset airflow CFM value. In general, equations (3) to (7) can be expressed as a standard equation $P(CFM)=C_3n^2+C_2n+C_1$ (Equation 8), where $C_1$, $C_2$, and $C_3$ are constants, n is speed, and P is power.

Figure 11:
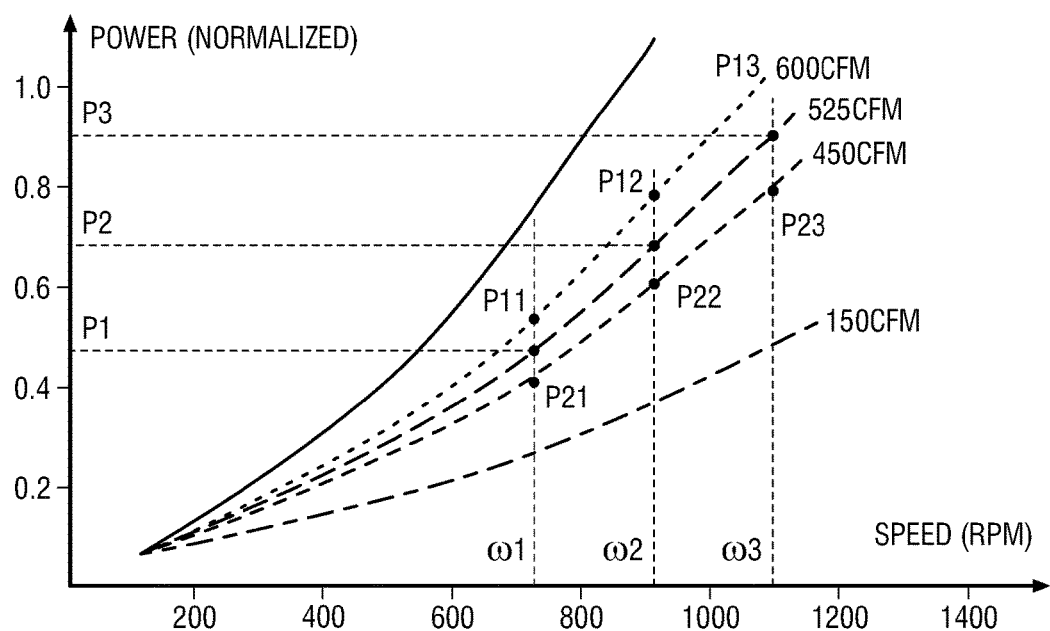
FIG. 11 is an illustration showing the fitting curves of experimental data when any input airflow is solved by the method of interpolation according to one embodiment of the disclosure.

Equations (3) to (7) define five modeling curves that provide working point trajectories for several constant airflow CFM options. As shown in FIG. 11, when a requested constant airflow CFM volume input is not on one of the determined modeling curves, an interpolation method may be used to obtain a new characteristic equation to fit to the requested constant airflow CFM volume input. For example, when a constant air volume input specifying that IN-CFM=525 CFM is received, the two adjacent curve models CFM1-600 CFM and CFM2-450 CFM may be identified. Then the two corresponding equations can be used to calculate the new equation for the 525 CFM curve. Based on the input-specified CFM rate, three selected speeds, $\omega_1$, $\omega_2$, and $\omega_3$ may be identified to calculate the power values at these speeds using the corresponding equations of the two adjacent modeling curves, as shown below.

$$\begin{bmatrix} W_i \\ P_1(600) \\ P_2(450) \end{bmatrix} = \begin{bmatrix} \omega_1 & \omega_2 & \omega_3 \\ p_{11} & p_{12} & p_{13} \\ p_{21} & p_{22} & p_{23} \end{bmatrix}$$

For the pair of power points ($p_{1i}$, $p_{2i}$) at a selected speed, a linear weighted interpolation can be used to calculate the $p_i$ value, as shown below.

$$p_i = p_{2i} + w \cdot (p_{1i} - p_{2i}) \quad (9)$$

In equation (9) above, i=1, 2, and 3, and w is the weighted coefficient that can be calculated as:

$$w = \frac{CFM - CFM2}{CFM1 - CFM2} \quad (10)$$

Noticing that CFM2≤CFM≤CFM1, and so 0≤w≤1, the following matrix equations can be calculated as, $$\begin{bmatrix} \omega_1^2 & \omega_1 & 1 \\ \omega_2^2 & \omega_2 & 1 \\ \omega_3^2 & \omega_3 & 1 \end{bmatrix} \begin{bmatrix} K_1 \\ K_2 \\ K_3 \end{bmatrix} = \begin{bmatrix} p_1 \\ p_2 \\ p_3 \end{bmatrix} \quad (11)$$

By solving the matrix equation, the coefficients of equation 8, $C_1$, $C_2$, and $C_3$ can be calculated such that the function $P = C_3 n^2 + C_2 n + C_1$ corresponding to the IN-CFM=P=525 CFM can be obtained. Therefore, the power equation of any requesting input airflow command IN-CFM can be obtained. Because the process may be completed in the MCU initialization, the MCU does not need to consume much CPU calculation power.

Motor real-time input power Pi may be filtered by a digital low-pass filter. Assume that samples of the input and output are taken at a sampling cycle, separated by Δt time (PWM switching frequency). The power inputs may be represented by the sequence ($P_{in1}, \ldots, P_{inn}$) and the outputs may be represented by the sequence ($P_{out1}, \ldots, P_{outn}$), which correspond to the same points in time, then the low-pass filter can be given as $$P_{ini} - P_{outi} = T \frac{P_{outi} - P_{outi-1}}{\Delta t},$$

where T is the time constant. Rearranging the terms above gives the recurrence relation, and the discrete-time low-pass filter can be expressed as the exponentially-weighted moving average, given as $P_{outi} = \alpha \cdot P_{ini} + (1-\alpha) \cdot P_{out\ i-1}$, where $$\alpha = \frac{\Delta t}{T + \Delta t}.$$

By definition, the smoothing factor relationship is 0≤α≤1. If α=0.5, then the time constant $$T = \Delta t \left( \frac{1-\alpha}{\alpha} \right)$$

becomes equal to the sampling period. If α≪ 0.5, then time constant T is significantly larger than the sampling interval. For power filtering in direct power control, α≤0.01. So Δt≈α·T.

The change from one filter output to the next is proportional to the difference between the previous output and the next input. This exponential smoothing property matches the exponential decay in the continuous-time system. As expected, as the time constant T increases, the discrete-time smoothing factor α decreases, and the output samples ($P_{out1}, \ldots, P_{outn}$), respond more slowly to a change in the input sample ($P_{in1}, \ldots, P_{inn}$) hence the system has more inertia.

This filter technique can also be applied to the DC bus voltage and DC bus current in scalar control, where the DC bus power is calculated by processing both signals on the DC bus.

It can be seen that Direct Power Control (DPC) may achieve power control by speed control. The function of the power/speed control logic may be to coordinate the power/speed loop time constant to ensure the stability of the system. Power calculations can also be calculated more precisely by motor control than by torque calculation. In addition, speed control to implement power control can be precisely controlled by motor controls using either scalar or vector control in comparison with the torque control.

Figure 13:
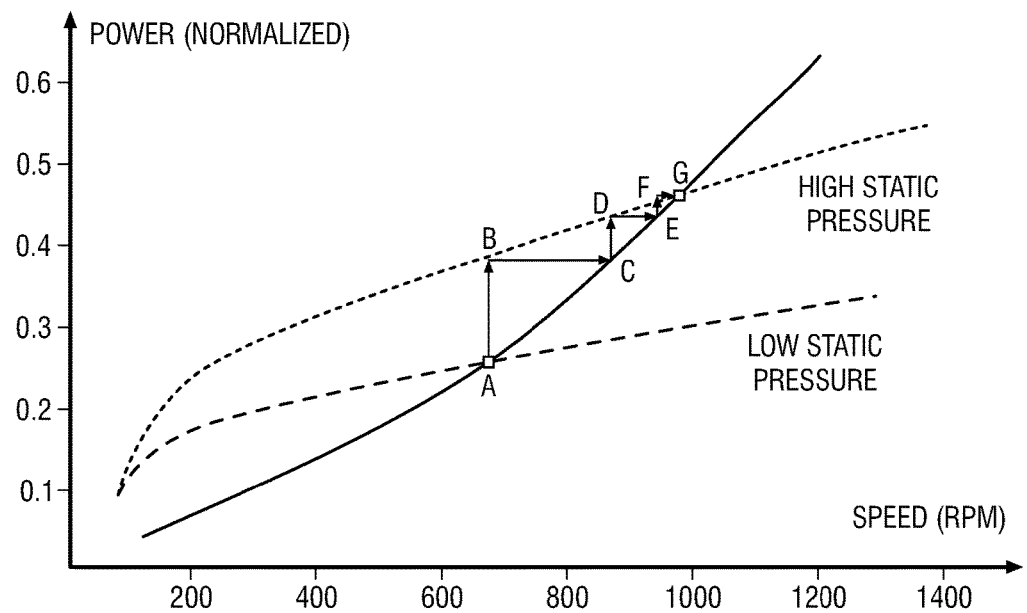
FIG. 13 is a schematic view of a control process of a constant airflow control method according to one embodiment of the disclosure.

The direct power control may be achieved by speed control because of the unique power and speed characteristic of blower load. As speed increases, the power increases simultaneously. Therefore, as the motor speed goes from zero speed to high speed, so does the power. The motor speed may rise until reaching a working point pair of power and speed that associates with the static pressure of the load condition, such as stable working point "A" in FIG. 13. When the static pressure suddenly increases while in the speed control mode, the motor must provide more power (or more torque) to maintain the speed because high static pressure has a larger power requirement to maintain the same speed. Therefore, the power suddenly rises to a higher work rate. When the motor system reaches a new working point "B" at the same speed, the algorithm will know that it is not a working point on the constant CFM trajectory curve, and will therefore determine a pair of speed/power on point "C." But point C is not a stable working point because higher power is demanded, so the motor operating point moves to point "D," and repeats the process until converging to a new stable working point "G."

Figure 14:
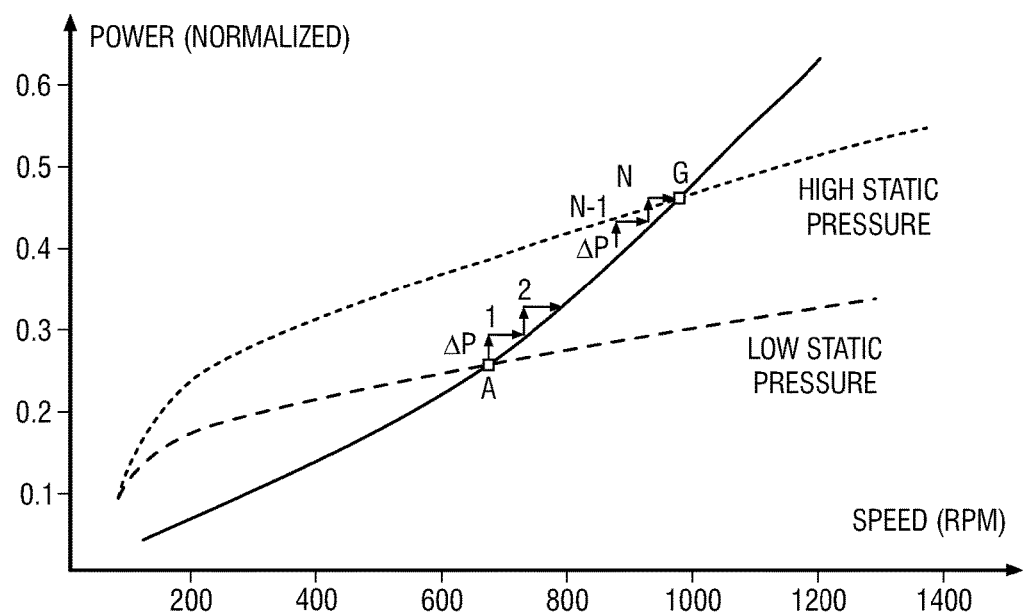
FIG. 14 is another schematic view of a control process of a constant airflow control method according to one embodiment of the disclosure.

In implementation, the power fluctuation that results from the sudden changes in pressure can be reduced by using a restricted power increment control. As shown in FIG. 14, the incremental power can be specified as ΔP. As soon as the power change is beyond the power increment ΔP, speed control may be engaged to control the speed. In this way, all the motor working points may be within a plus/minus bandwidth on the corresponding constant airflow CFM trajectory curve. As a result, the airflow control system may be controlled in a more stable operation during any transition when pressure changes.

Figure 15:
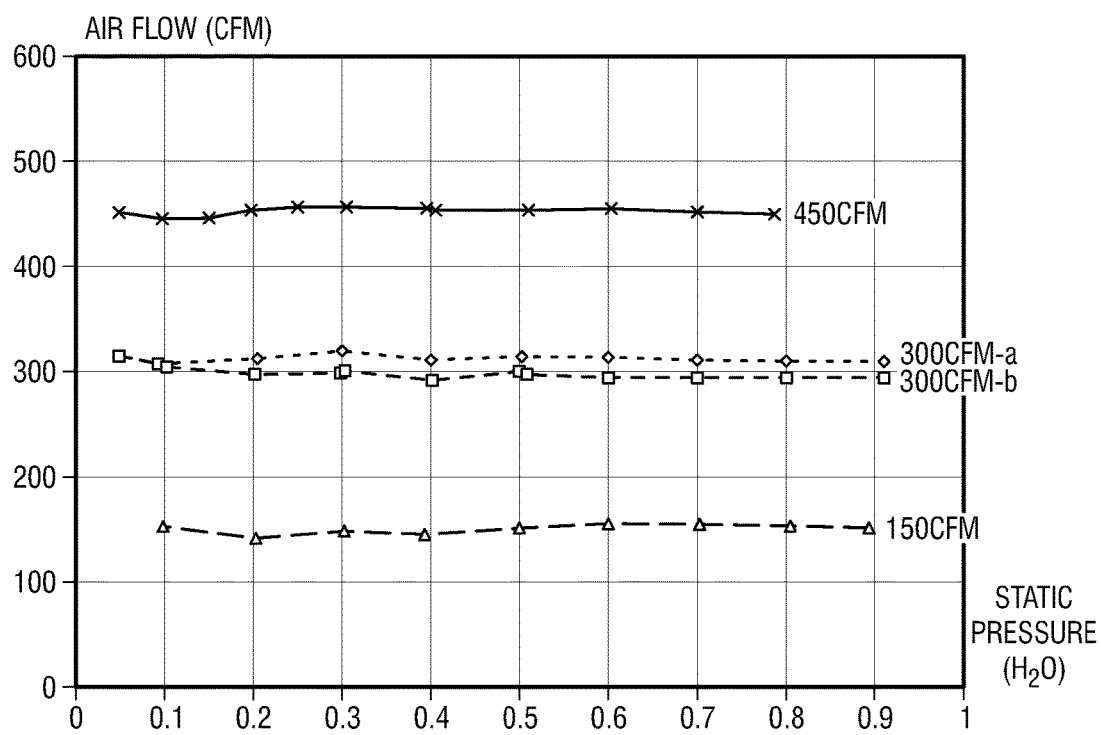
FIG. 15 is an illustration showing test results of a constant airflow control method through experimental verification according to one embodiment of the disclosure.

FIG. 15 is an illustration showing test results of a constant airflow control method obtained through experimental verification. The test results show that the entire system performance meets the requirements of the system, as shown in FIG. 15.

Figure 12:
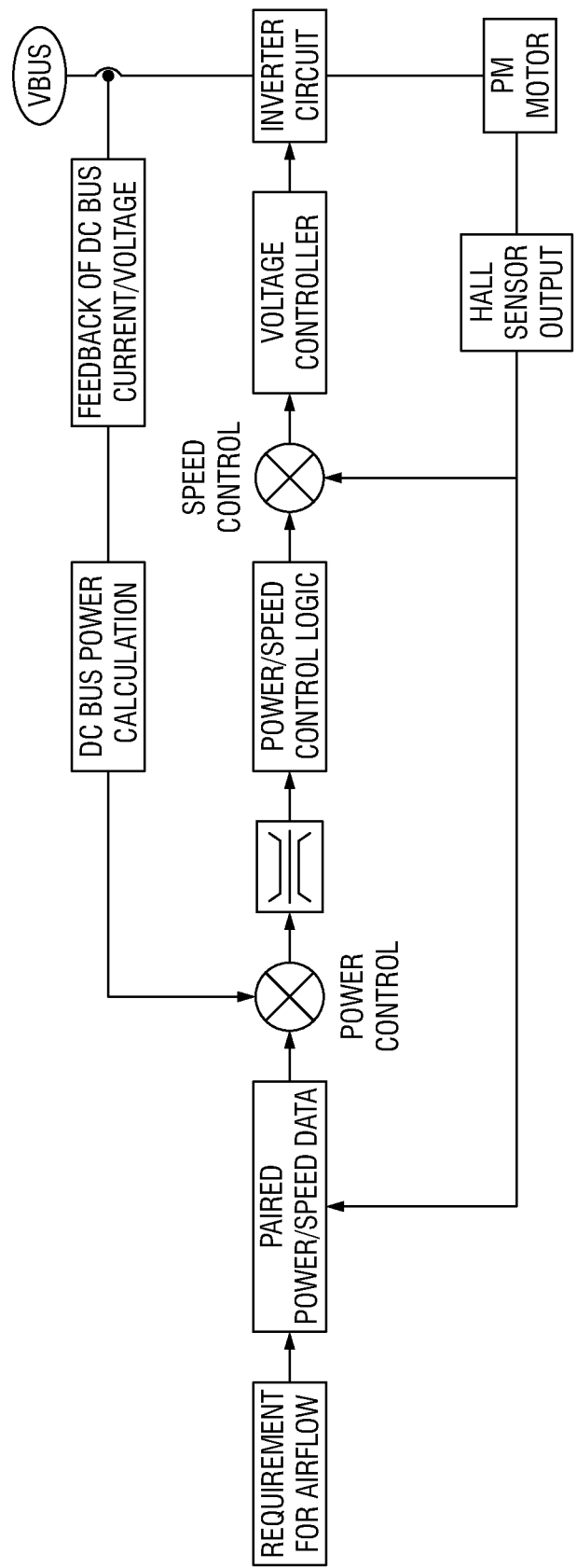
FIG. 12 is a schematic block diagram illustrating the control logic of a constant airflow control method according to one embodiment of the disclosure.

FIG. 12 is a logic block diagram of the algorithm for a constant airflow control method in a PM motor scalar control application, wherein the input power is computed based on the DC bus voltage and DC bus current. In some embodiments, power and speed of the motor may be limited to a maximum power $P_{max}$ and a maximum speed $n_{max}$.

The motor real-time input power value $P_i$ may be computed based on the DC bus voltage/current fed back to the MCU. Then, based on the air volume specified via the external input IN-CFM and the corresponding power/speed data, the target motor input power Pt may be calculated. A comparison of the calculated target motor input power value Pt and the motor real-time power $P_i$ may be performed to obtain the power difference ΔP. The power of the motor may be adjusted until $P_i$ approximately equals Pt, for example, within about plus or minus 5 percent. While the power is adjusted, the power differential ΔP may be limited to a maximum to avoid power differentials ΔP that are too large. Power difference ΔP may be output using the power/speed control logic, speed loop control, and PWM inverter speed control, as shown in FIG. 12.

Example 2

The greatest difference between this example and example 1 is that in example 1 the motor real-time input power value $P_i$ is calculated based on the real-time bus current and the real-time bus voltage based on scalar control. In contrast, in example 2, the PM motor employs sensorless vector control, wherein the calculation of the motor real-time input power $P_i$ is more complicated.

Figure 16:
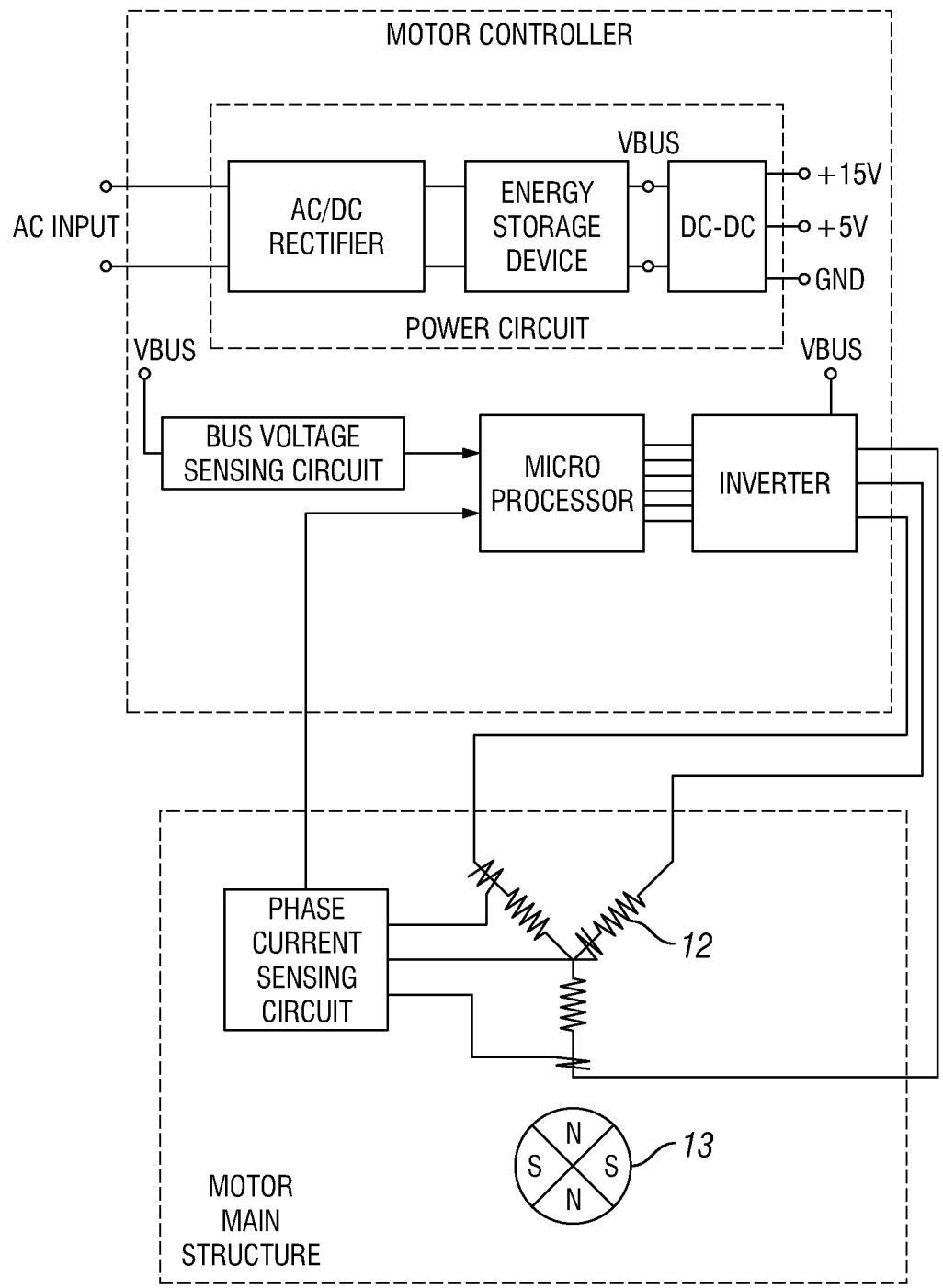
FIG. 16 is a circuit block diagram illustrating a motor controller of a PM motor according to one embodiment of the disclosure.
Figure 17:
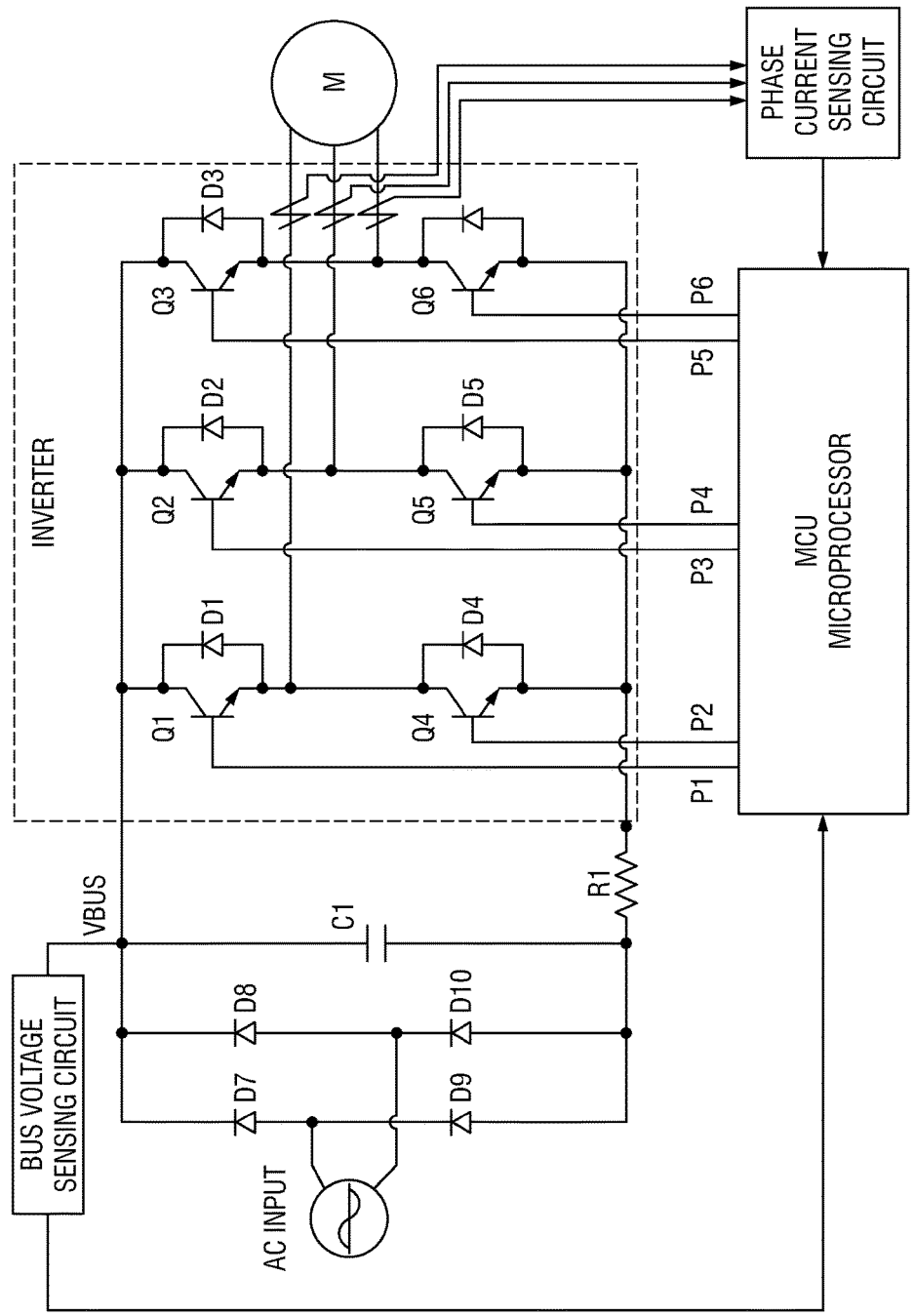
FIG. 17 is a circuit block diagram corresponding to FIG. 12.
Figure 18:
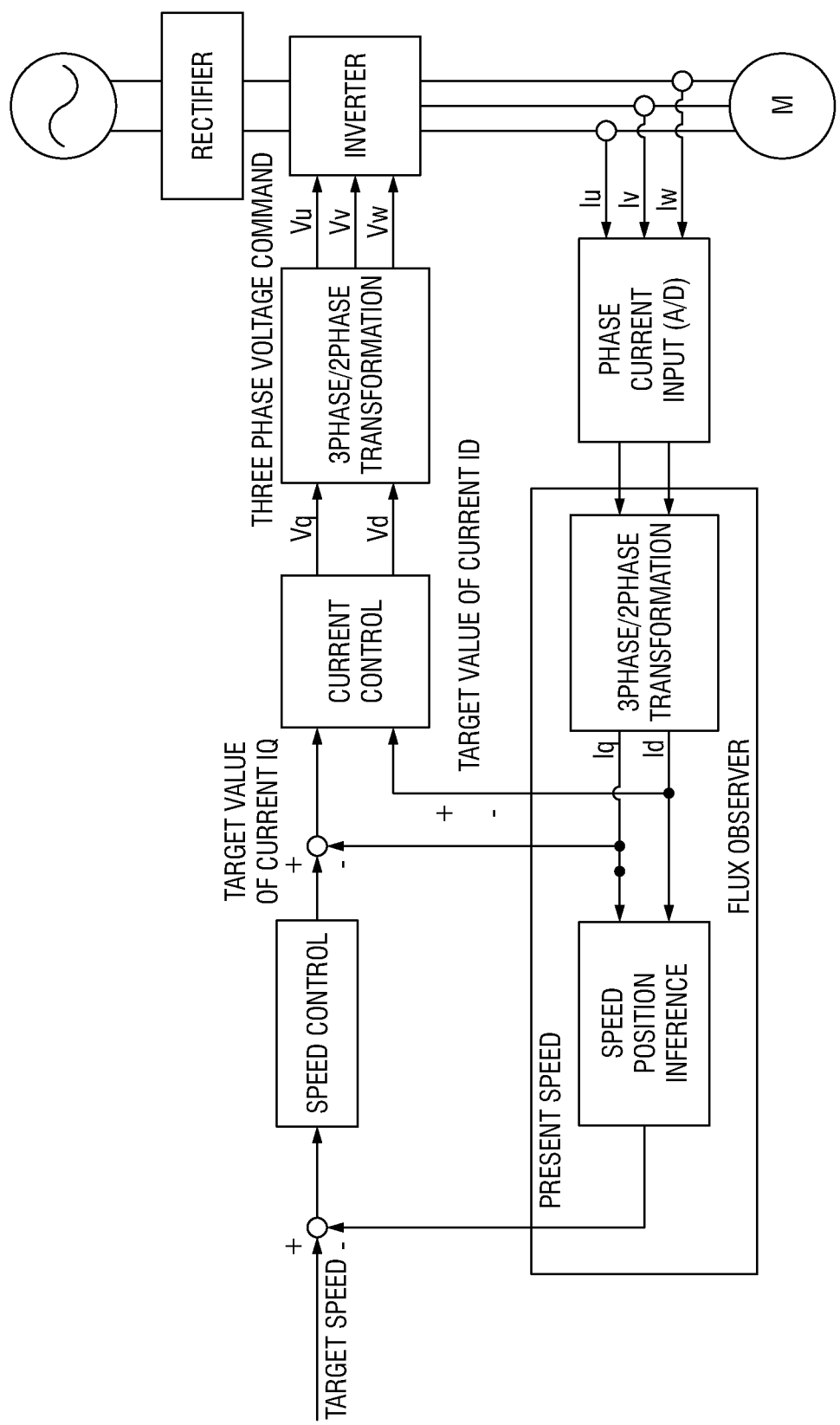
FIG. 18 is a schematic block diagram of a traditional and typical PM motor vector control scheme.

As shown in FIG. 16 and FIG. 17, assuming that the PM motor is a three phase brushless DC permanent magnet synchronous motor and that sensorless vector control is used to determine the rotor position, a phase current sensing circuit may be used to sense the phase current of the stator windings. The phase current may be input to the microprocessor, and a flux observer within the microprocessor may calculate the rotor rotational speed n and rotor position based on the phase current and DC bus voltage. AC input may pass through the full-wave rectifier circuit that includes diodes D7, D8, D9, and D10. A DC bus voltage $V_{bus}$ may be output on one end of the capacitor C1, wherein DC bus voltage $V_{bus}$ is associated with the AC input voltage. FIG. 18 is a block diagram of a motor control system using vector control.

Figure 19:
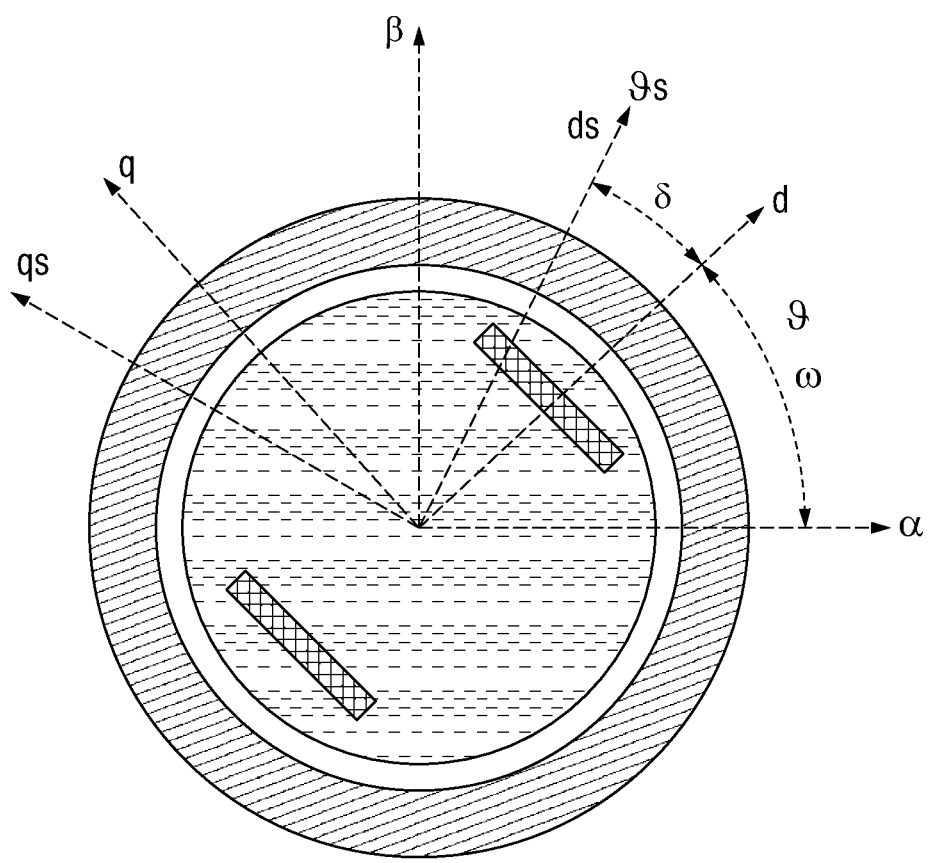
FIG. 19 is a relation diagram of each coordinate system of a traditional and typical PM motor vector control scheme.

FIG. 19 illustrates the coordinate systems that may be used for vector control. Vector control theory is sufficiently described in textbooks and patent literature, so there is no need for a description here. If the target speed being controlled were known, closed loop control can be realized through vector control. There are three coordinate systems illustrated in FIG. 19: a fixed Cartesian coordinate system (α-β coordinates), a rotor rotating coordinate system (d-q axis coordinate system), and a stator flux rotating coordinate system (ds-qs axis coordinate system). In FIG. 19, ω represents the rotor speed, theta represents the rotation intersection angle for the d-q axis coordinate system and the α-β coordinates, and δ represents the rotation loading angle for the d-q axis coordinate system and the ds-qs axis coordinate system. According to an embodiment, the vector current and vector voltage for the d-q axis coordinate system can be converted to the current and voltage for the α-β coordinate system.

In vector control, such as in the vector control systems shown in FIGS. 16 and 17, a motor operation parameter sensing circuit may include a phase current sensing circuit and a bus voltage sensing circuit to sense the phase current and bus voltage, respectively. The sensed data may be input to a microprocessor for further processing. The real-time phase currents may be converted to current $I_\alpha$ and current $I_\beta$ on α-β beta coordinates, and the real-time bus voltages may be converted to voltage $V_\alpha$ and voltage $V_\beta$ on α-β coordinates. The motor real-time input power may be calculated as $P_i=3/2(V_\alpha \cdot I_\alpha + V_\beta \cdot I_\beta)$.

Figure 20:
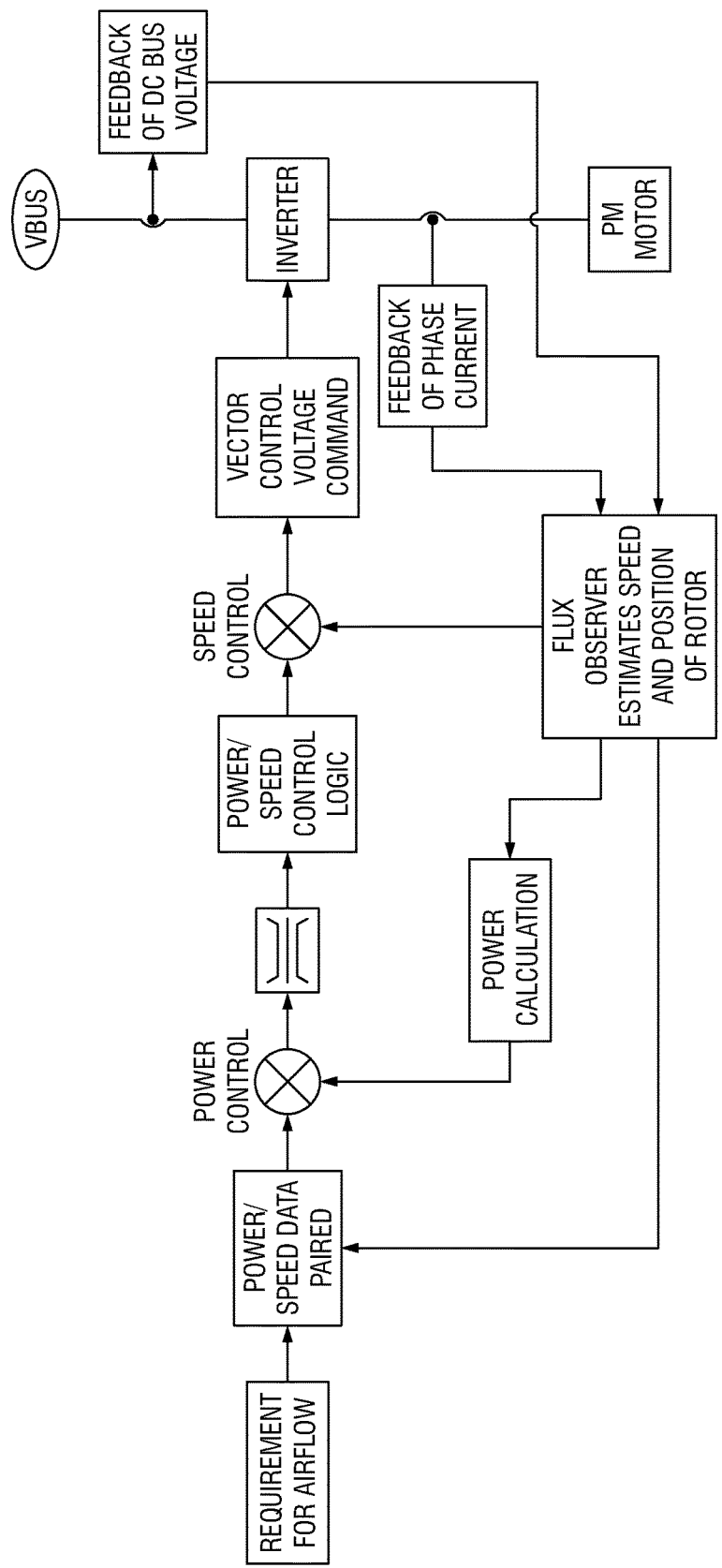
FIG. 20 is a schematic block diagram illustrating the control logic for a constant airflow control method according to one embodiment of the disclosure.

FIG. 20 is a schematic block diagram illustrating the control logic for a constant airflow control method using sensorless vector control for direct-power controlling a PM motor system. The input power may be calculated using vector control. The power may be used as the power control after being filtered. A flux observer may be used to estimate the rotor speed and position. Based on the matching of the external input airflow command IN-CFM and power/speed data, the corresponding target motor input power value Pt may be determined by a function P=f(n). The target motor input power value Pt and the motor real-time output power Pi may be compared, and the power difference ΔP may be obtained. The power of the motor may be adjusted until $P_i$ approximately equals Pt, for example, within about plus or minus 5 percent, and while the power is adjusted, the power differential ΔP may be limited to a maximum to avoid power differentials ΔP that are too large. Power difference ΔP may be output using the power/speed control logic and the speed loop control, wherein speed loop control may be realized through vector control.

What is claimed is:

1. A method for providing constant airflow with a variable speed motor in a Heating, Ventilation, and Air Conditioning (HVAC) system, comprising:
   (a) determining a power and speed of the motor to obtain a motor control working point of the motor, wherein the motor control working point specifies the power and speed of the motor;
   (b) obtaining a target airflow rate for the HVAC system; and
   (c) determining a target airflow working point of the motor that yields the target airflow rate in the HVAC system, wherein the target airflow working point is determined based, at least in part, on the obtained target airflow rate for the HVAC system, and wherein the target airflow working point specifies the power and speed of the motor that yields the target airflow rate in the HVAC system;
   (d) determining whether the motor control working point is approximately equal to the target airflow working point of the motor; and
   (e) successively adjusting the power and speed of the motor when the motor control working point is not approximately equal to the target airflow working point, wherein successively adjusting the power and speed of the motor comprises adjusting the motor power and then subsequently adjusting the motor speed, and wherein the motor power and speed are successively adjusted until the motor control working point of the motor is approximately equal to the target airflow working point such that airflow provided by the HVAC system is maintained constant at the target airflow rate before and after the step of successively adjusting the power and speed of the motor.

2. The method of claim 1, wherein determining the target airflow working point of the motor that yields the target airflow rate in the HVAC system comprises identifying the target airflow working point on a constant airflow model, wherein the constant airflow model specifies a plurality of motor control working points that yield the target airflow rate in the HVAC system.

3. The method of claim 2, wherein determining whether the motor control working point is approximately equal to the target airflow working point of the motor comprises determining whether the motor control working point is approximately equal to the target airflow working point identified on the constant airflow model.

4. The method of claim 2, further comprising determining the constant airflow model by interpolating between the motor control working points on a first constant airflow model that yields a constant airflow rate in the HVAC system that is higher than the target airflow rate and the motor control working points on a second constant airflow model that yields a constant airflow rate in the HVAC system lower than the target airflow rate.

5. The method of claim 1, further comprising determining the power based, at least in part, on instantaneous values of a direct current (DC) bus voltage and a DC bus current on an inverter coupled to the motor.

6. The method of claim 1, further comprising determining the power based, at least in part, on direct current (DC) bus voltage on an inverter coupled to the motor and phase currents of the motor, wherein the phase currents correspond to the currents on a plurality of phase windings of a stator of the motor.

7. The method of claim 1, further comprising maintaining constant the motor control working point of the motor when the motor control working point is approximately equal to the target airflow working point.

8. The method of claim 1, further comprising repeating steps (a)-(e) such that the motor provides constant airflow in the HVAC system.

9. The method of claim 1, wherein the motor is a permanent magnet motor.

10. An apparatus for providing constant airflow in a Heating, Ventilation, and Air Conditioning (HVAC) system, comprising:
   a variable speed motor; and
   a motor controller coupled to the variable speed motor and configured to control the operation of the variable speed motor, the motor controller comprising a processor configured to perform the steps of:
      (a) determining a power and speed of the motor to obtain a motor control working point of the motor, wherein the motor control working point specifies the power and speed of the motor;
      (b) obtaining a target airflow rate for the HVAC system;
      (c) determining a target airflow working point of the motor that yields the target airflow rate in the HVAC system, wherein the target airflow working point is determined based, at least in part, on the obtained target airflow rate for the HVAC system, and wherein the target airflow working point specifies the power and speed of the motor that yields the target airflow rate in the HVAC system;
      (d) determining whether the motor control working point is approximately equal to the target airflow working point of the motor; and
      (e) successively adjusting the power and speed of the motor when the motor control working point is not approximately equal to the target airflow working point, wherein successively adjusting the power and speed of the motor comprises adjusting the motor power and then subsequently adjusting the motor speed, and wherein the motor power and speed are successively adjusted until the motor control working point of the motor is approximately equal to the target airflow working point such that airflow provided by the HVAC system is maintained constant at the target airflow rate before and after the step of successively adjusting the power and speed of the motor.

11. The apparatus of claim 10, wherein the processor configured to perform the step of determining the target airflow working point of the motor that yields the target airflow rate in the HVAC system comprises the processor being configured to perform the step of identifying the target airflow working point on a constant airflow model, wherein the constant airflow model specifies a plurality of motor control working points that yield the target airflow rate in the HVAC system.

12. The apparatus of claim 11, wherein the processor configured to perform the step of determining whether the motor control working point is approximately equal to the target airflow working point of the motor comprises the processor being configured to perform the step of determining whether the motor control working point is approximately equal to the target airflow working point identified on the constant airflow model.

13. The apparatus of claim 11, wherein the processor is further configured to perform the step of determining the constant airflow model by interpolating between the motor control working points on a first constant airflow model that yields a constant airflow rate in the HVAC system that is higher than the target airflow rate and the motor control working points on a second constant airflow model that yields a constant airflow rate in the HVAC system lower than the target airflow rate.

14. The apparatus of claim 10, wherein the processor is further configured to perform the step of determining the power based, at least in part, on instantaneous values of a direct current (DC) bus voltage and a DC bus current on an inverter coupled to the motor.

15. The apparatus of claim 10, wherein the processor is further configured to perform the step of determining the power based, at least in part, on direct current (DC) bus voltage on an inverter coupled to the motor and phase currents of the motor, wherein the phase currents correspond to the currents on a plurality of phase windings of a stator of the motor.

16. The apparatus of claim 10, wherein the processor is further configured to perform the step of maintaining constant the motor control working point of the motor when the motor control working point is approximately equal to the target airflow working point.

17. The apparatus of claim 10, wherein the processor is further configured to perform the step of repeating steps (a)-(e) such that the motor provides constant airflow in the HVAC system.

18. The apparatus of claim 10, wherein the motor is a permanent magnet motor.

* * * * *